United States Patent [19]

Kron

[11] 4,299,576

[45] Nov. 10, 1981

[54] HELMET COUPLED ACCELERATION SIMULATOR

[75] Inventor: Gerald J. Kron, Binghamton, N.Y.

[73] Assignee: The Singer Company, Binghamton, N.Y.

[21] Appl. No.: 34,064

[22] Filed: Apr. 27, 1979

[51] Int. Cl.³ .............................................. G09B 9/00
[52] U.S. Cl. .................................................. 434/59
[58] Field of Search .................. 35/12 R, 12 C, 12 E, 35/12 G, 12 H; 128/68, 75, 78, 782; 272/94–96; 273/DIG. 17, 190 R–190 C, 183 B

[56] References Cited

U.S. PATENT DOCUMENTS

| | | | |
|---|---|---|---|
| 1,238,492 | 8/1917 | Byrne | 273/190 R |
| 1,636,753 | 7/1927 | Olcott | 273/190 R |
| 2,791,999 | 5/1957 | Bustamante | 272/94 X |
| 3,309,795 | 3/1967 | Helmore | 35/12 E |
| 3,403,675 | 10/1968 | Carr | 128/75 |
| 3,768,464 | 10/1973 | Greissing | 128/75 |
| 3,824,707 | 7/1974 | Ashworth et al. | 35/12 E |
| 3,876,212 | 4/1975 | Oppenheimer | 273/190 R X |
| 4,168,060 | 9/1979 | Hohenfeldt | 272/94 |

OTHER PUBLICATIONS

Christensen, K. K. and Johnson, L. L.; "Study to Determine Methods of Simulating g Effects"; 1958; pp. 1–107.

Primary Examiner—Vance Y. Hum
Attorney, Agent, or Firm—Stephen C. Kaufman; J. Dennis Moore; Jeff Rothenberg

[57] ABSTRACT

Method and apparatus for simulating acceleration forces on the head and helmet of a pilot of a vehicle simulator. A device for producing those forces (10) is positioned unobtrusively in the cockpit of the simulator. An apparatus (22, 80) is provided which inconspicuously interconnects the force-producing device and the pilot's helmet (14) after the pilot has seated himself in the vehicle simulator. After the helmet and force-producing device have been inter-connected, a drive sequence is implemented which drives the force-producing device to provide forces to the helmet of the pilot in a manner which simulates the experience of the actual acceleration forces of the vehicle being simulated.

9 Claims, 7 Drawing Figures

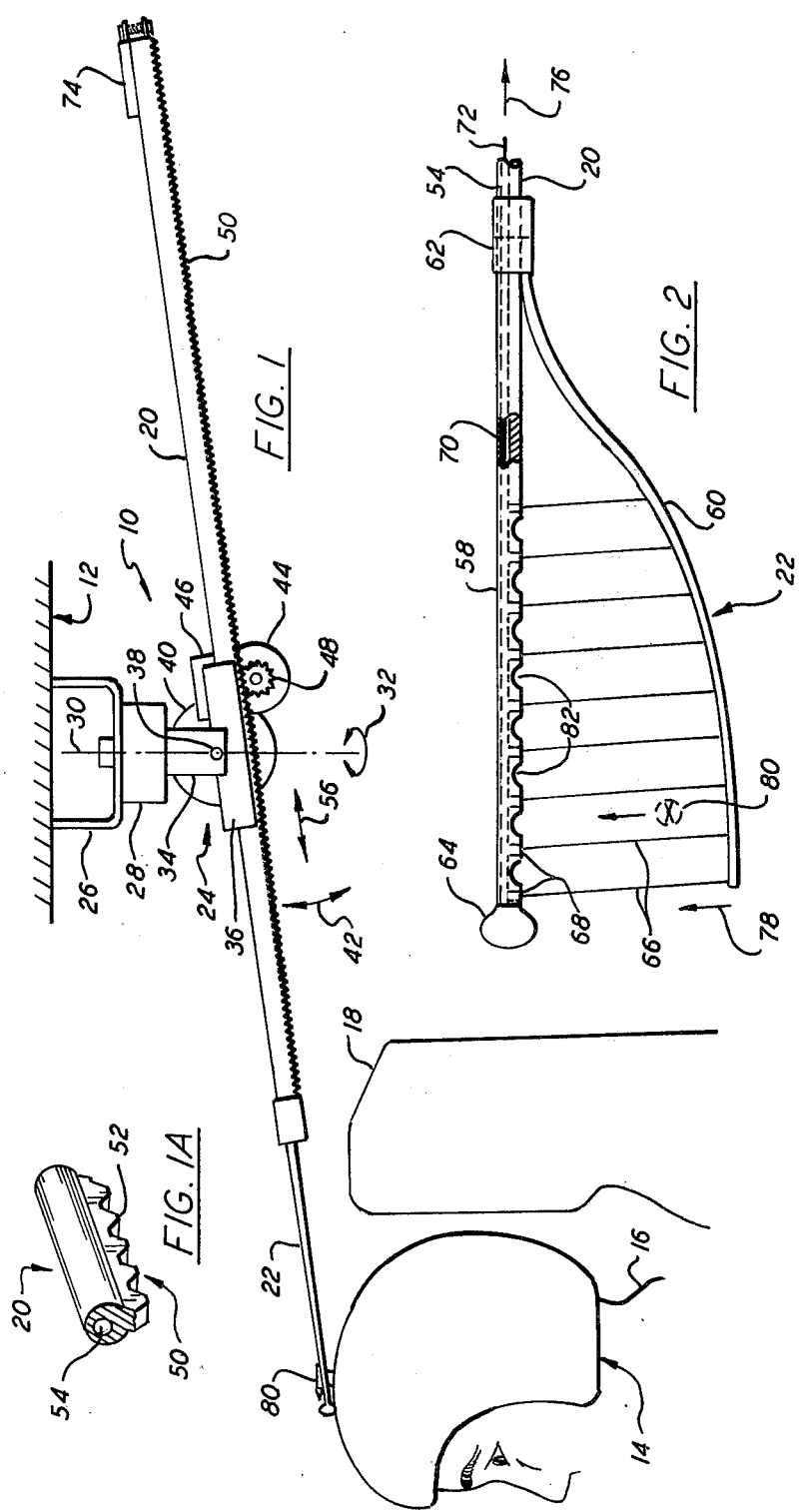

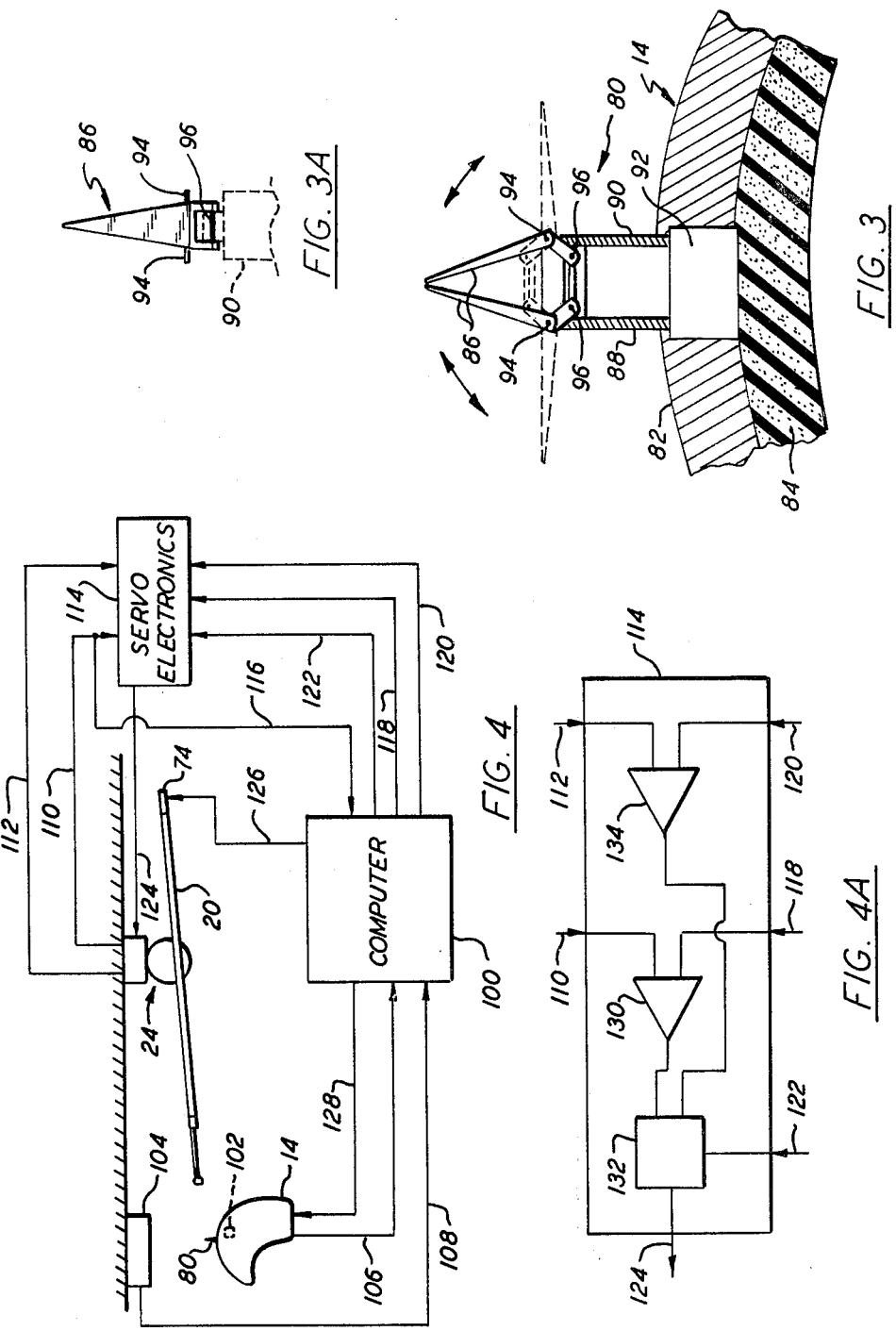

HELMET COUPLED ACCELERATION SIMULATOR

The Government has rights in this invention pursuant to Contract No. F33615-77-C-0055 awarded by the Department of the Air Force.

BACKGROUND OF THE INVENTION

1. Field of the Invention

The present invention relates to acceleration force simulators, and more particularly relates to a method and apparatus for providing acceleration forces to the head of a pilot of a vehicle simulator in an unobtrusive manner.

2. Brief Description of the Prior Art

A fundamental process in which all humans engage is the control of the static and dynamic state of their bodies. Whether crawling, or controlling high speed vehicles, humans employ large set of physiological sensors in maintaining their safety and sense of well being while accomplishing the change of motion/position state they desire. As part of the physical task learning process humans learn to discriminate among the physiological stimulii these sensors present in order to define and refine their perception of bodily motion. This assessment is then used to modulate physical control actions.

One sub-set of physiological stimuli which is believed to be a significant source of motion and position state information are the sensations associated with the forces on the head of a subject and the sensations associated with the wearing of a helmet.

For a seated subject incurring acceleration forces, for example the pilot of an aircraft, the helmet/head combination somewhat resembles an inverted pendulum. Thus, under longitudinal accelerations the head tends to pitch fore and aft, giving the appearance of pitch about the upper portion of the spinal support.

For lateral and vertical accelerations, one must keep in mind that the center of gravity of the mass supported by the spinal column is located slightly forward of the axis of the column. Therefore, lateral accelerations give rise to a head rolling or swaying movement coupled with a small amount of yaw. Vertical accelerations tend to compress or extend the neck region and are accompanied by a pitching movement. Muscular reaction summoned to attempt to resist these movements provide stimulii concerning force direction and magnitude. That portion of the movement not resisted produced flesh pressure and visual perspective stimuli.

The presence of a helmet causes additional stimuli to arise from the helmet/head inertia coupling. During upward accelerations the helmet settles on the skull, eliciting increased pressure sensations and changing the subject's visual peripheral view at the edge of the visor cut-out. This change in peripheral view couples, in the same directional sense, with that occurring because of the head pitch-down effect noted above.

The desirability of duplicating these stimuli in the vehicle simulator environment has been recognized, and at least one device has been proposed to simulate these effects. K. K. Christensen and L. L. Johnson included such a proposed device in a 1958 study report entitled "Study to Determine Methods of Simulating g Effects." The device was designed to simulate $G_z$, or vertical, acceleration forces, and consisted of a large yoke attached to a pilot's helmet. A cable connected the yoke to an air cylinder located in front of and below the pilot. The yoke was also connected to an air cylinder which was mounted on an extension of the pilot's seat above and behind him. By activating either the upper or lower air cylinder, positive or negative $G_z$ head/helmet motion would be produced. A pair of pressure pads located on each side of the face supplemented the helmet/yoke arrangement and produced a pulling sensation on the face and jaw of the pilot.

It is not known whether this proposed configuration was ever implemented. However, it can be safely said that it possesses certain limitations which would make it largely unacceptable for use in modern vehicle simulators. For one thing, the device provides movement in only one axis, namely the vertical axis. In addition, the yoke and seat mounted cylinder arrangement is extremely constricting and would unnaturally force the pilot to sit in an upright posture with little freedom of movement.

Perhaps the most significant limitation of the device is its environmental obtrusiveness. Great pains are taken in the construction of modern vehicle simulators to provide the pilot with a cockpit environment which as closely as possible resembles the actual cockpit of the vehicle being simulated, down to the smallest detail. For an operator of a simulator, putting on a helmet with a large yoke, and attaching that to a cable or other coupling element would be an unnatural and unacceptably distracting experience. Add to that the fact that the pilot's range of helmet/head motion is then severely restricted, as mentioned above, and the practical limitations of this design become quite evident.

The present invention overcomes these problems and provides a helmet/head motion simulator which operates unobtrusively while providing full, three dimensional motion capability.

SUMMARY OF THE INVENTION

Accordingly, it is an object of the present invention to provide a helmet/head motion simulator.

It is a further object to provide such a simulator which provides unobtrusive yet realistic operation in the cockpit of a vehicle simulator.

A still further object is to provide such a simulator which automatically engages the helmet of an operator of a vehicle simulator after the operator has seated himself for operation of the vehicle.

These and other objects are accomplished by providing a helmet, a system for providing forces to the helmet, and coupleable thereto, and means for automatically and inconspicuously fastening the force-providing system to the helmet, for example after the operator has seated himself in the vehicle simulator.

BRIEF DESCRIPTION OF THE DRAWINGS

For a fuller understanding of the nature and objects of the invention reference should be had to the following detailed description taken in connection with the accompanying drawings, in which:

FIG. 1 is a side view of the mechanical assembly of the preferred embodiment of the present invention;

FIG. 1A is an orthogonal view of a short section of the boom portion of the assembly shown in FIG. 1;

FIG. 2 is a top view of the capture harness portion of the assembly shown in FIG. 1;

FIG. 3 is a cross sectional view of the locking mechanism of the assembly shown in FIG. 1;

FIG. 3A is a front view of a leaf shown in FIG. 3; while

FIG. 4 is a block schematic diagram of the electrical interconnections of the preferred embodiment of the present invention; and FIG. 4A is a schematic diagram of the servo electronics for one force axis, employed in the preferred embodiment of the present invention.

DETAILED DESCRIPTION OF THE PREFERRED EMBODIMENT

The present invention may be practiced with any vehicle or other motion-type simulator in which the operator would be subjected to acceleration forces in the actual vehicle or other device which is being simulated. For the sake of convenience and clarity of description, the preferred embodiment will be discussed in connection with a flight simulator. However it is to be understood that the principles employed herein may be applied to any motion-type simulator with only such design modification as may be necessary to adapt the invention to the particular simulator configuration.

Turning now to the drawings, FIG. 1 shows a side view of the mechanical apparatus 10 of the preferred embodiment of the present invention mounted on the ceiling 12 of a cockpit, in engagement with the helmet 14 of a pilot 16 seated in the seat 18 of a flight simulator.

Apparatus 10 comprises generally a boom 20 on one end of which is located a capture harness 22, shown here engaged with a locking mechanism 80, and a drive system 24 for the boom 20. At the other end of the boom 20 is a motor-driven spool assembly 74, discussed further below. The drive system 24 is mounted to the ceiling 12 of the cockpit by way of a bracket 26. Mounted to the bracket 26 is a "pancake-type" torque motor 28 of conventional design. This motor 28 provides torque forces to the boom 20 about the vertical axis 30 as shown by the curved arrow 32.

The rotor of this torque motor 28 is connected to a second U-shaped bracket 34. This bracket 34 is connected to a "C" bearing 36 which is free to pivot about a pin 38 which passes through it and the second clamp 34. A second "pancake-type" torque motor 40 is securely connected to the second bracket 34 and has its rotor connected to the "C" bearing 36. This motor 40 imparts torque forces to the "C" bearing 36 (and thus boom 20) about the pin 38 as shown by the arrow 42.

A third torque motor 44 is rigidly mounted to the "C" bearing 36 by way of a bracket 46. This torque motor 44 has a pinion gear 48 connected to its rotor which engages a long rack 50 on the bottom of the boom 20.

FIG. 1A shows a view of a short section of the boom 20. Its generally circular upper cross-sectional configuration, which permits its use in conjunction with a "C" bearing, can be seen clearly, as can the teeth 52 of the rack 50. The small apperture 54 will be discussed below.

Returning to FIG. 1, it can be seen that actuation of the third torque motor 44 turns the pinion 48 which, by way of the rack 50, imparts a translational motion to the boom 20 as shown by the arrow 56.

The arrows 32, 42 and 56 define three coordinate axes, $\Psi$, $\theta$ and L, respectively. The significance of these axes will be discussed below.

FIG. 2 shows the top view of the boom capture harness 22 which is used to "capture" the locking mechanism 80 and maintain connection therewith. It comprises generally a rod-like manifold portion 58, a flexible anchor member 60 which is secured to the manifold portion 58 by a clamp 62, and a bumper 64. The anchor member 60 is resiliently biased away from manifold 58, in the position shown in FIG. 2. The anchor member 60 serves to anchor a number of thin cables 66, approximately evenly spaced, which pass through a corresponding number of apertures 68 disposed along the side of the manifold 58, as shown. Each of these apertures 68 joins a central channel 70 which extends the length of the manifold 58 and joins channel 54 where the manifold 58 joins the boom 20 within the clamp 62, as shown. Each cable 66 passes through one of the apertures 68 and extends down the channel 70 to form, with each of the other cables 66, a bundle 72 which extends the length of the boom 20. At the opposite end of the boom 20 the bundle 72 wraps around the motor-driven spool assembly 74, shown in FIG. 1.

Returning to FIG. 2, by activating the motor-driven spool assembly the bundle 72 can be pulled, as shown by arrow 76. When the bundle is so pulled the anchor element 60 is likewise pulled toward the manifold 58, as shown by arrow 78. Thus, if the locking mechanism 80 were to be located within one of the areas defined by two of the cables 66, as shown in dashed lines, it would be drawn toward the manifold 58 to be snugly clamped in a cylindrical recess 82 in the manifold 58. In this way capture of the locking mechanism can be effected.

In order to insure that the locking mechanism 80 will remain engaged with the capture harness 22 during the operation of the apparatus 10, the locking mechanism 80 is provided with locking means. FIG. 3 is a cross sectional view of the locking mechanism 80 which shows this locking means. The locking mechanism 80 is embedded in the plastic material 82 of the helmet 14, as shown. Layer 84 is the foam innerlining of a standard helmet.

The locking mechanism 80 comprises a pair of leaves 86 which are pivotably connected to a generally tubular housing 88, and a plunger 90 contained in housing 88. The plunger 90 is connected to a solenoid 92 and moves up and down. The plunger 90 is spring biased in the downward direction. Activation of the solenoid 92 pushes the plunger 90 upward. As can be seen, FIG. 3 shows the locking mechanism 80 with the plunger 90 in the downward position. When the solenoid 92 is activated, the plunger 90 moves upward, propelled by the solenoid 92. As the plunger 90 moves up, leaves 86 pivot about the pins 94 as a result of the interaction between plunger 90 and pins 96 which pass through a slot in the top portion thereof. FIG. 3 shows in dashed lines the position of leaves 86 when the plunger 90 is in its full upward position. FIG. 3A shows a front view of one of the leaves 86. The top portion of plunger 90 is shown in dashed lines to illustrate the connection between the leaf 86 and the plunger 90.

In a "capture" sequence, the leaves 86 of the locking mechanism 80 are pulled to their "up" position by the spring bias mentioned above. The capture harness 22 is brought to the vicinity of the drogue locking mechanism 80 and passed over it, snaring the drogue 80 between two of the cables 66, as discussed above. The spool motor assembly 74 is activated, causing the anchor member 60 to engage the drogue 80 in one of the cylindrical cut-outs 82 of the manifold 58. Immediately, the solenoid is activated and the leaves 86 move to their "down" position, completely securing the boom assembly 20 to the helmet 14. Thus locked in place the drive system 24 can drive the boom 20 according to a schedule which imparts the desired forces to the helmet 14.

It can therefore be understood that the present invention requires a bi-modal capability. One mode, denominated the "capture mode," is activated after the pilot 16 has seated himself in the simulator in preparation for operating the simulator. Initiating the "flight" program can be made to cause activation. During the capture mode the drive system 24 directs the capture harness 22 toward the locking mechanism 80 in the manner discussed above. After the boom has been secured to the helmet 14, the second mode, denominated the "drive mode," is engaged. The drive system 24 provides the appropriate drive forces to the boom which thus imparts resultant forces to the helmet 14 to simulate the acceleration forces which the pilot 16 would be experiencing in the actual aircraft being piloted.

FIG. 4 shows a schematic diagram of the electrical interconnections of the preferred embodiment of the present invention. The system is built around a computer 100. The computer 100 receives various inputs and performs the necessary calculations to produce the appropriate drive signals for the drive system 24, as will be discussed more fully below.

To enable the "homing" function implemented by the "capture mode," the preferred embodiment of the present invention employs a helmet position sensor system, such as the "SPASYN (Space Synchro)" system available from Advanced Technology Systems, a division of the Austin Company, 450 West First Ave., Roselle, N.J. 07203. This system employs a radiation transmitter, located within the helmet of the pilot, and a set of receivers located at fixed positions within the cockpit, to sense the relative position of the helmet within the cockpit, and to produce coordinate signals representative of that position. In fact, the signals will provide position information as to the locking mechanism 80. The transmitter 102 and receiver set 104 of such a system are shown schematically in FIG. 4. Lines 106 and 108 carry the locking mechanism position coordinate signal information to the computer 100.

Each of the torque motors in the drive system 24 is provided with a position follow-up device, such as a potentiometer, to provide position feedback. Each is also provided with a torque transducer to provide torque feedback as well. Both of these devices are of known construction and operate according to principals well known in the art. In the preferred embodiment each of these feedback devices is formed integrally with its associated torque motor to provide a compact unit.

It will be readily understood that both the position and torque feedback information of drive system 24 is with respect to each of the 3 axes mentioned earlier, namely $\Psi$, $\theta$ and L, which, it will be recalled, are associated with the directions represented by arrows 32, 42 and 56 in FIG. 1. This coordinate axis system will not, in general, be the same as the coordinate axis system with respect to which the locking mechanism position information is provided by the helmet position sensor system 102, 104. Therefore, one of the functions which computer 100 provides is that of simple coordinate axis transformation, which is implemented according to principles well known in the computer art.

Referring again to FIG. 4, line 110 represents an electrical connection bearing the position feedback information from each of the three position feedback sensors. Line 112 represents the corresponding torque feedback line. As can be seen, both lines 110 and 112 feed into a system of servo electronics 114. In addition, line 110 branches off and also provides position feedback information to the computer 100 by way of a branch line 116.

The servo electronics system 114 receives position command information from the computer 100 by way of a line 118, and torque command information from the computer 100 by way of another line 120. The command information is supplied for each drive axis. Information as to whether the system is in the "capture mode" or the "drive mode" is supplied to the servo electronics system 114 by way of a third line 122. The drive output signals from the servo electronics system 114 are fed to the drive system 24 by line 124.

Finally, line 126 carries a cable spool motor command signal to the spool assembly 74, and line 128 carries a leaf actuate command signal to the helmet 14.

The electrical system operates in the following manner. When the system is initially activated, the first mode which is implemented is the "capture mode." Locking mechanism position information is received by way of lines 106 and 108. Capture harness 22 position information is received by way of line 116. The computer performs a simple transformation on the locking mechanism position coordinate information to convert it to the coordinate axis system of the boom, resulting in $\Psi$, $\theta$, and L values cooresponding to the position of the locking mechanism 80. Each of these values, which may be denominated $\Psi_H$, $\theta_H$ and $L_H$, is compared with the corresponding $\Psi$, $\theta$ and L value representing the capture harness 22 position, which may be denominated $\Psi_B$, $\theta_B$ and $L_B$, and a set of difference values, $\Delta\Psi$, $\Delta\theta$, and $\Delta L$ is calculated, by way of a simple subtraction step. This difference value is divided by an arbitrary integer, for example, 5, and the resulting value is added to the value of the locking mechanism position signal to arrive at a position command signal value. For example, for the "$\Psi$" torque motor 28 this value would be $\Psi_H + (\Delta\Psi/5)$.

Of course, the position command signal value could be made to be simply $\Psi_H$. However, calculating the command value in the above manner assures that the capture harness 22 will approach the locking mechanism 80 in a smooth, asymptotic manner, making it less likely for the boom 20 to overshoot and bump into the helmet 14 which is a highly undesirable result.

The position command value is converted, according to principles well known in the computer art, in a D/A converter section of the computer 100, to a signal voltage representative of the boom command position. This signal voltage is fed to the servo electronics 114 by way of line 118.

FIG. 4A shows a schematic of the servo electronics for one of the three drive axes. It is to be understood that each drive axis will have its own associated servo electronics identical to that shown in FIG. 4A. The signal voltage on line 118 is compared with the position feedback signal on line 110 in a differential amplifier 130, and the output is fed, through a single pole double throw ("SPDT") switch 132, to line 124 and thence to the appropriate torque motor.

The position difference signals, $\Delta\Psi$, $\Delta\theta$ and $\Delta L$, are continuously monitored. When each of them falls below an associated predetermined value, corresponding to the condition wherein the locking mechanism 80 is ensnared between two of the cables 66, the computer 100 sends a command signal on line 126 to the spool assembly 74 and the cable bundle 72 is retracted, capturing the drogue 80 in the manner described above. After a predetermined interval following the sending of the spool motor command signal, another command signal is sent, along line 128, causing the leaves 86 to drop into their "down" position, completing the capture.

Simultaneously, the "capture mode" is disengaged, and the "drive mode" is activated. At this time the computer 100 sends a signal on line 122 which cuts off the output of amplifier 130 and connects the output of a second amplifier 134 to line 124.

In the drive mode the computer 100 continuously calculates, in a manner well known in the simulation art, the acceleration which the cockpit, and hence the pilot 16 would be undergoing at any given instant as a result of the pilot's operational activities. This acceleration information is converted into force information relative to the head of the pilot 16 by way of a relatively simple program which takes into account the mass of the helmet/head combination and computes according to Newton's Law, $F=ma$. The resulting force information is converted, according to well-known principles, into force information relative to the $\Psi$, $\theta$ and L axes, and the resultant transformed force information is fed through a D/A converter to line 120 which inputs the servo electronic system 114.

As shown in FIG. 4A, the servo electronics 114 receives torque feedback information through line 112 and compares it with the torque command signal on line 120 in the second differential amplifier 134, and the output drive signal is applied to line 126 through the switch 132, in a manner analogous to that of the position feedback system.

During the "drive mode" the computer 100 continues to monitor the position of the capture harness 22 and of the locking mechanism 80, continuously calculating values for $\Delta\Psi$, $\Delta\theta$ and $\Delta L$. When any of the $\Delta$ values rises above the predetermined "capture" value, corresponding to disengagement of the system, the computer immediately returns to the "capture mode." Thus, if the pilot were to lean his head forward excessively, for example in the act of picking something up off the floor, such that the capture harness 22 were forced up and off the locking mechanism 80, the system would immediately recover and engage in the homing process of the "capture mode" to reengage the system.

Thus, the present invention provides simulated acceleration forces to the operator of a vehicle simulator which forces can act in three dimensions, providing realistic force cuing to the simulator operator. This is done in an unobtrusive manner with little if any loss in cockpit environmental fidelity. Interconnection of the force-producing means with the operator's helmet is done automatically and inconspicuously rendering the invention highly suitable for modern vehicle simulators.

While the above is a description of what is considered to be the preferred embodiment of the present invention, other embodiments will readily suggest themselves, once the essentials of the invention are comprehended. For example, the force-providing system could be a net, secured at three points to the rotor of a torque motor, and the interconnecting means could then be an upraised "snag"-type element on the pilot's helmet for capture in the web of the net. The net would be normally retracted and would be dropped gently on the helmet for "capture." Interconnection could be by magnetic means as well, for example. It is therefore intended that all matters contained in the above description or shown in the accompanying drawings shall be interpreted as illustrative rather than limiting.

What is claimed is:

1. Apparatus for providing forces to an operator of a vehicle simulator simulative of the acceleration forces the operator would experience in an actual vehicle, comprising:
   (a) a helmet wearable by the operator;
   (b) force means for providing simulated acceleration forces to said helmet; and
   (c) capture means for automatically and inconspicuously fastening said force means to said helmet after the operator has positioned himself in the vehicle simulator said helmet being adapted to receive said force means.

2. The apparatus of claim 1 wherein said force means comprises:
   (a) a mechanical element; and
   (b) motor means for imparting drive forces to said mechanical element relative to the vehicle simulator which produce resultant forces on said helmet simulative of the acceleration forces the operator would experience in an actual vehicle.

3. The apparatus of claim 2 wherein said capture means comprises:
   (a) receiving means attached to said helmet for receiving connecting means; and
   (b) connecting means attached to said mechanical element for connecting said mechanical element to said receiving means.

4. The apparatus of claim 3 wherein said capture means further comprises:
   (a) helmet position means for sensing the position of said receiving means relative to the vehicle simulator and providing first signals representative thereof;
   (b) connector position means for sensing the position of said connecting means relative to the vehicle simulator and providing second signals representative thereof;
   (c) first computing means responsive to said first and said second signals for computing the positional differences between said connecting means and said receiving means and providing third signals representative thereof; and
   (d) first converter means responsive to said third signal for providing first drive signals to said motor means implementative of an approach function whereby said connecting means will be brought to a capture position of sufficient proximity to said receiving means such that attachment can occur.

5. The apparatus of claim 4 further comprising:
   (a) monitor means for determining when said third signals fall below predetermined values corresponding to said connecting means being at said capture position and for producing a first command signal at that time; and
   (b) connector actuating means responsive to said first command signal for causing said connecting means to attach to said receiving means.

6. The apparatus of claim 5 wherein the vehicle simulator includes a computer which provides acceleration output signals representative of the acceleration which the cockpit of the simulated vehicle would be undergoing, and wherein said force means further comprises:
   (a) second computing means responsive to the acceleration output signals for computing desired values of said drive forces and providing force signals representative thereof; and
   (b) second converter means responsive to said fourth signals for providing second drive signals to said motor means to drive said motor means to produce said drive forces on said mechanical element.

7. The apparatus of claim 6 further comprising:
(a) switch command means for producing a second command signal substantially simultaneous with the attachment of said connecting means to said receiving means; and
(b) switch means connecting said first and second converter means to said motor means and responsive to said second command signal for switching said motor means from said first to said second drive signals upon receipt of said second command signal.

8. A method of providing forces to an operator of a vehicle simulator simulative of the acceleration forces the operator would experience in an actual vehicle, comprising the steps of:
(a) providing a helmet wearable by the operator;
(b) providing force means for providing simulated forces to said helmet said helmet being adapted to receive said force means;
(c) automatically and inconspicuously fastening said force means and said helmet after the operator has positioned himself in the vehicle simulator; and then
(d) providing said simulated acceleration forces to said helmet by way of said force means.

9. The method of claim 8 wherein the step of fastening is performed by:
(a) storing said force means in an unobtrusive position in the vehicle simulator;
(b) automatically moving said force means into proximity with said helmet after the operator has positioned himself in the vehicle simulator; and then
(c) connecting said force means to said helmet.

* * * * *